(12) United States Patent
Madden

(10) Patent No.: US 7,328,719 B2
(45) Date of Patent: Feb. 12, 2008

(54) VALVE STATE SENSING MODULE

(75) Inventor: Jeremy S. Madden, Lavonia, GA (US)

(73) Assignee: Ross Operating Valve Company, Troy, MI (US)

( * ) Notice: Subject to any disclaimer, the term of this patent is extended or adjusted under 35 U.S.C. 154(b) by 547 days.

(21) Appl. No.: 10/914,929

(22) Filed: Aug. 10, 2004

(65) Prior Publication Data

US 2006/0032535 A1 Feb. 16, 2006

(51) Int. Cl.
*F16K 37/00* (2006.01)
*H01H 35/26* (2006.01)

(52) U.S. Cl. .................. 137/554; 137/557; 137/552; 200/81.5

(58) Field of Classification Search ........ 137/553–557, 137/625.64, 552; 251/63.5, 63.6; 200/81.5, 200/61.86
See application file for complete search history.

(56) References Cited

U.S. PATENT DOCUMENTS

| 430,090 | A | * | 6/1890 | Sewall ..................... 137/556.3 |
| 3,367,365 | A | * | 2/1968 | Stevens ....................... 137/553 |
| RE28,520 | E | | 8/1975 | Mahorney et al. |
| 4,227,547 | A | | 10/1980 | Cameron |
| 4,376,450 | A | | 3/1983 | Fayfield et al. |
| 4,542,767 | A | | 9/1985 | Thornton et al. |
| 4,967,792 | A | | 11/1990 | Magee |
| 5,179,974 | A | * | 1/1993 | Taniguchi ................... 137/554 |
| 5,218,994 | A | * | 6/1993 | Jeschke ...................... 137/554 |
| 5,223,822 | A | | 6/1993 | Stommes et al. |
| 5,518,028 | A | | 5/1996 | Walker |
| 5,538,037 | A | | 7/1996 | Pizão |
| 6,105,927 | A | * | 8/2000 | Zelczer et al. ................ 251/58 |
| 6,135,147 | A | | 10/2000 | Peters et al. |
| 6,481,460 | B2 | | 11/2002 | Fukano et al. |

* cited by examiner

*Primary Examiner*—John Rivell
*Assistant Examiner*—Andrew J. Rost
(74) *Attorney, Agent, or Firm*—Mark Mollon; MacMillan, Sobanski & Todd

(57) ABSTRACT

A sensing module for a fluid valve utilizes a sensor body having a sensing chamber. An extension member is fixedly coupled to a main valve element, is slidable within the sensing chamber along a first axis, and has an inclined cam surface. A plunger has a cam follower for engaging the cam surface and is slidable along a second axis between a first position when the valve element is in its deactuated position and a second position when the valve element is in its actuated position. The plunger is exposed to the sensing chamber. A sensing switch is coupled to the plunger for generating a switch signal indicative of the first and second positions. The valve body and the sensing body cooperate to form a fluid passage between the outlet port and the sensing chamber, and the plunger moves to the second position when the valve element is in the deactuated position if a fluid pressure greater than a predetermined pressure is present at the outlet port.

21 Claims, 6 Drawing Sheets

| | SWITCH SIGNAL ON | SWITCH SIGNAL OFF |
|---|---|---|
| PILOT ON | OK | STUCK VALVE ELEMENT |
| PILOT OFF | STUCK VALVE ELEMENT OR LEAK | OK |

VALVE STATE SENSING MODULE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to monitoring the proper operation of fluid control valves, and, more specifically, to an integrated monitor for sensing both proper movement of the valve element and the absence of pressure in the valve outlet with the valve element deactuated.

Fluid valves are important components of modem industrial control and manufacturing systems. For example, they are used in controlling the application of pressurized air to pneumatically-operated machines such as presses and other machine tools. It is often desirable or necessary to monitor the position of automatically controlled valves to ensure that a particular valve properly actuates and deactuates appropriately. Monitoring may also be necessary to ensure the safety of the human operators. A monitoring signal may be used to generate a visual or audible indication of a malfunctioning valve, may be used to automatically deactivate system operation in response to a fault, or both.

Many different types of sensing technologies have been used for monitoring valve position. One such technology is a magnetic sensor. For example, a movable valve element is configured to affect a magnetic field at a predetermined sensing location as the valve element moves between an actuated and a deactuated position. The magnetic field can be generated by a permanent magnet (either moving or stationary) or by an electromagnet. The magnetic sensor detects the magnetic field and generates a signal. This signal is sent to additional circuitry that provides monitoring information. A magnetic sensor has the advantage of having minimal interference with operation of the movable valve element, but has the disadvantage of being relatively expensive compared to other sensing technologies.

Pressure switches have also been used to monitor valve performance. For example, assuming a source of pressurized fluid (e.g., air) is present, the position of a valve element can be monitored by detecting the presence of pressurized fluid in the outlet of the valve. Pressure switches can be accommodated with essentially any kind of valve without affecting the design of the moving elements; however, they are also relatively expensive.

One of the more cost-effective sensing technologies is an electric sensing switch. An electric sensing switch is mechanically connected to a valve so that the conduction state of the switch is determined according to the position of the valve element. Electric sensing switches, however, have been able to sense only the movement (i.e., position) of the valve internal element to which it is connected. These switches are not able to sense all possible valve failures, such as a leaking poppet, that allow pressurized fluid at the valve inlet to reach the valve outlet even though the valve internal element has properly moved to its deactuated position. Therefore, a separate pressure switch has been needed in order to monitor fully the state of a valve.

The ability to sense a failed valve state when pressurized fluid is present at the outlet port even though the valve is shut off can be critical to safe use of fluid valves. In a 3-port valve application (i.e., a valve with inlet, outlet, and exhaust ports), a leaking valve poppet might not result in significant pressure at the outlet port because of the pressure relief provided by the exhaust port. If, however, a silencer or filter attached to the exhaust port becomes backed up (i.e., clogged) then an undesirable pressure can build up in the outlet port. Thus, in safety critical applications, such as controlling pneumatic presses using a 3-port valve, it may be desirable to sense a leaky poppet quickly. In a 2-port valve application (i.e., a valve with an inlet and an outlet port), an exhaust port is not present. Thus, a failure will result in high pressure being present at the outlet port, which is undesirable. The use of 2-port valves may be advantageous in applications that use a fluid other than air (e.g., nitrogen) to prevent the fluid from escaping to the atmosphere due to the cost of the fluid and contamination concerns. Hence, it is desirable to detect both failure states of the valve as discussed above.

SUMMARY OF THE INVENTION

The present invention has the advantage of monitoring both proper movement of the valve element and the absence of pressure in the valve outlet with the valve element deactuated using a single sensing switch in an integrated sensor module.

In one aspect of the invention, a monitored valve system comprises a valve body and a sensing module. The valve body includes an inlet port, an outlet port, and a valve element having a piston surface at one end thereof for receiving a pilot pressure to move the valve element between a deactuated position and an actuated position. The inlet port and the outlet port are fluidically decoupled when the valve element is in the deactuated position, and the inlet port and the outlet port are fluidically coupled when the valve element is in the actuated position.

The sensing module comprises a sensor body having a sensing chamber. An extension member is fixedly coupled to the valve element, is slidable within the sensing chamber along a first axis, and has an inclined cam surface. A plunger has a cam follower for engaging the cam surface and is slidable along a second axis between a first position when the valve element is in the deactuated position and a second position when the valve element is in the actuated position. The plunger is exposed to the sensing chamber. A sensing switch is coupled to the plunger for generating a switch signal indicative of the first and second positions. The valve body and the sensing body cooperate to form a fluid passage between the outlet port and the sensing chamber, and the plunger moves to the second position when the valve element is in the deactuated position if a fluid pressure greater than a predetermined pressure is present at the outlet port.

DETAILED DESCRIPTION OF PREFERRED EMBODIMENTS

Figures 1, 6:
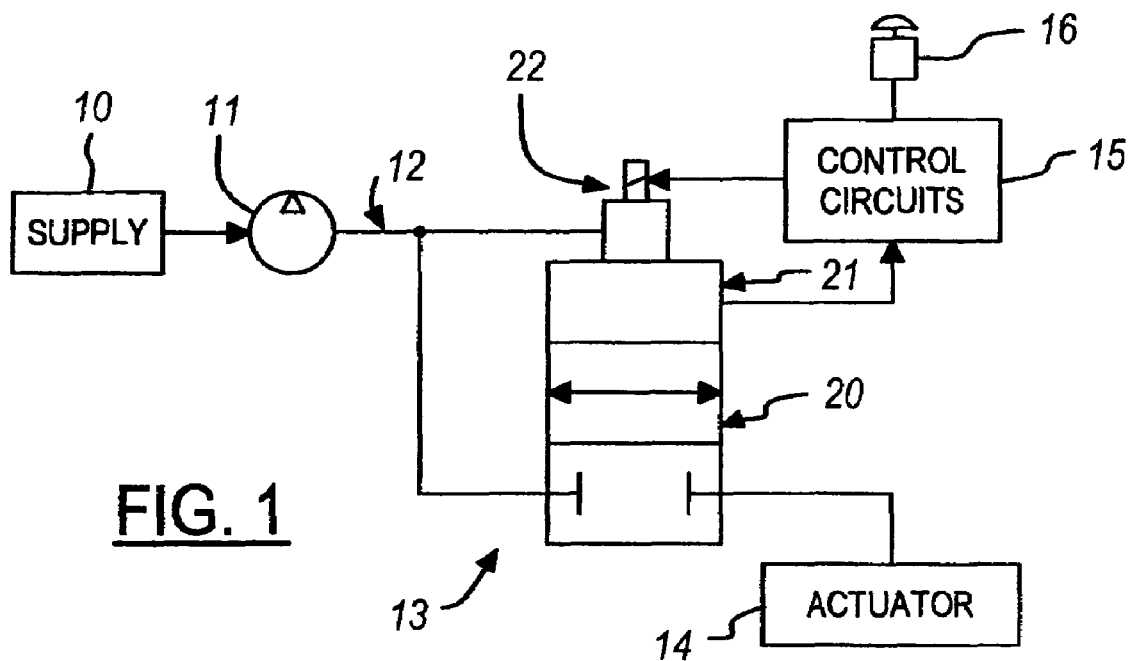
FIG. 1 is a block diagram showing an automatic valve control system.
FIG. 6 is a decision matrix showing the detection of a failed valve state.

Referring to FIG. 1, a control valve system for operating pneumatically controlled machinery is shown in which a fluid supply 10 is coupled to a compressor 11 for supplying pressurized fluid (e.g., air) to a fluid distribution system 12. A fluid control valve 13 selectably couples the pressurized fluid to an actuator 14 (such as a pneumatic press). Control circuits 15 provide an energizing signal to fluid control valve 13 in response to a hand switch 16.

Fluid control valve 13 has a valve body 20, a sensing module 21, and a solenoid-operated pilot valve 22. Pilot valve 22 supplies pressurized fluid that moves an internal valve element in response to the energizing signal from control circuits 15. Sensing module 21 determines the actual position of the valve element and provides a sensor signal to control circuits 15 to indicate the position. Control circuits 15 can compare the sensor signal with its expected value based on the status of the energizing signal to the pilot valve in order to detect a faulted valve state.

Figure 2:
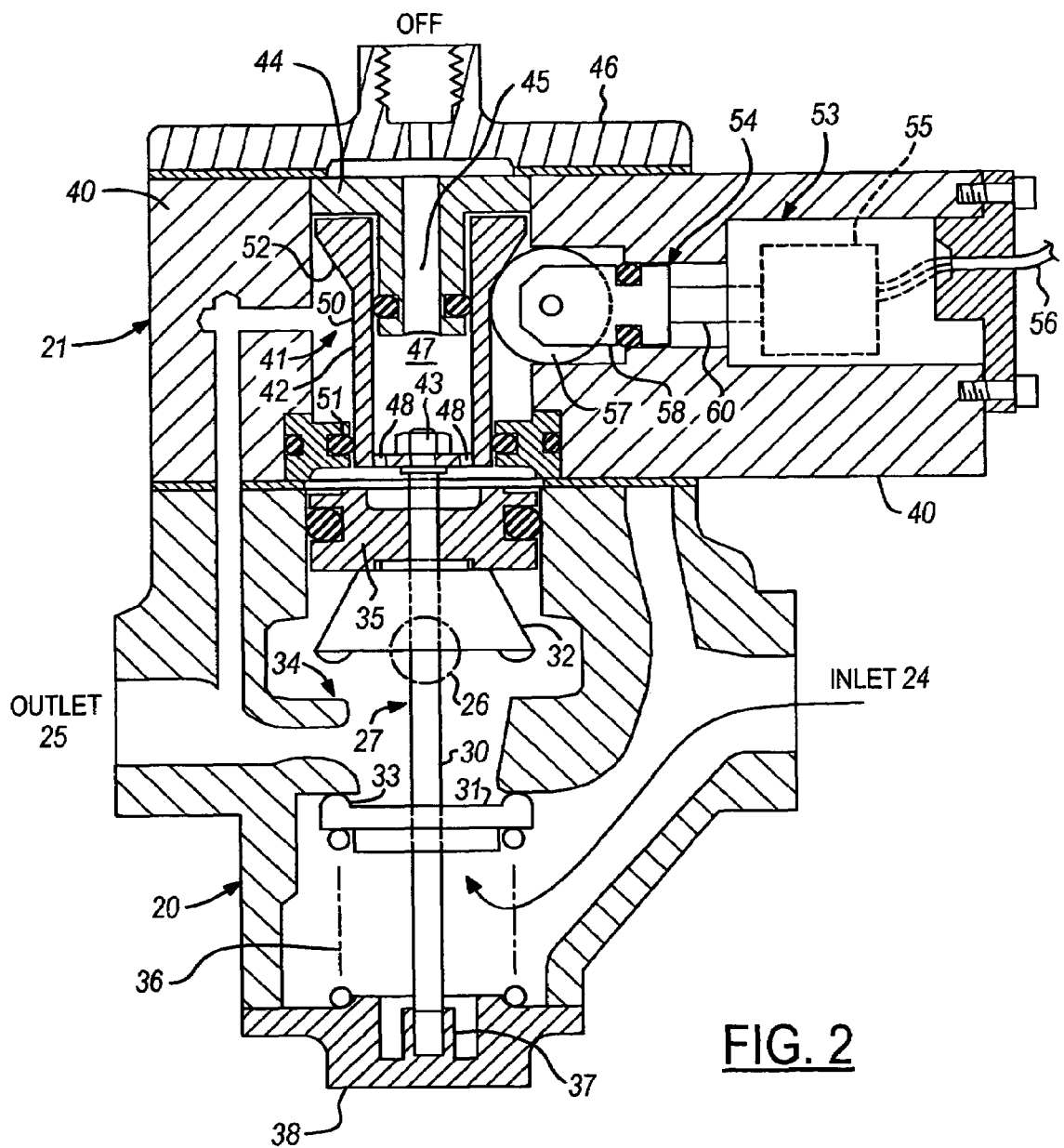
FIG. 2 is a cross-sectional view of a fluid valve of the present invention in a deactuated position without a failure condition.

FIG. 2 shows a valve system with the dual-action sensing module of the present invention. In a preferred embodiment of FIGS. 2-5, a 3-port/2-position valve is shown which includes a valve body 20 having an inlet port 24, and outlet port 25, and an exhaust port 26. A valve element 27 is slidable longitudinally within valve body 20 and includes a valve stem 30. An inlet poppet 31 and an exhaust poppet 32 are fixedly mounted to stem 30 for alternately engaging valve seats 33 and 34 when valve element 27 is in its deactuated position and its actuated position, respectively. A piston 35 is mounted to stem 30 at the upper end of valve body 20 for receiving pilot pressure to actuate valve element 27 against a spring 36 which bears against inlet poppet 31. The lower end of stem 30 is slidably received in a guide 37 formed in an end plate 38 that also receives the lower end of spring 36.

Sensing module 21 includes a body 40 forming a sensing chamber 41 which receives an extension member 42. Preferably, extension member 42 may be formed as a tube fixedly connected to valve element 27 by a nut 43 at one end of the tube and slidably received on a boss member 44 at the other end of the tube. Boss member 44 has an internal bore 45 fluidically coupled by an end fitting 46 to a source of pilot pressure so that pilot fluid passes into an interior space 47 within extension member 42 and through end-holes 48 to act against the upper surface of piston 35 in order to move valve element 27 into its actuated position. Seals 50 and 51 prevent pilot fluid from leaking to the exterior of extension member 42.

Extension member 42 includes a cam surface 52 at an inclined angle with respect to its longitudinal axis so that longitudinal movement in response to movement of valve element 27 controls the state of a sensor 53. Sensor 53 includes a plunger 54 that actuates an electrical switch 55. Electrical switch 55 generates a switch signal which is then transmitted by output wires 56. For example, wires 56 may present an open circuit when plunger 54 is in a first position (extended into sensing chamber 41) and a short circuit when plunger 54 is in a second position (retracted from sensing chamber 41).

Figure 3:
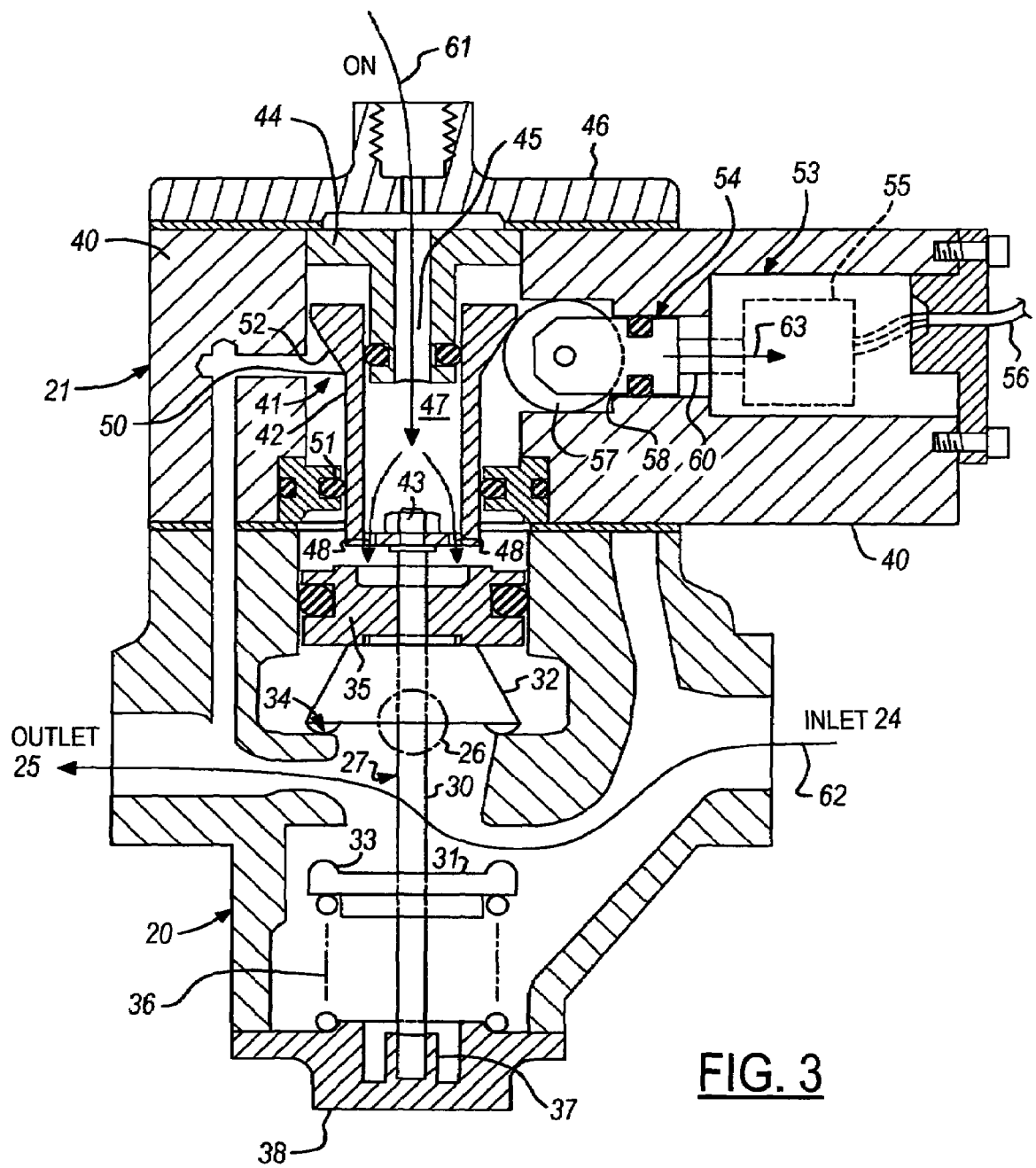
FIG. 3 is a cross-sectional view of a fluid valve of the present invention in an actuated position without a failure condition.

Plunger 54 includes a roller 57 rotationally mounted to a yoke member 58 having a push rod 60 coupled to electrical switch 55. As shown in FIG. 3, when pilot pressure is applied, pilot fluid flows along a path 61 to act upon piston 35 to move valve element 27 to its actuated position, thereby creating a flow path 62 between inlet port 24 and outlet port 25. As extension member 42 moves downward in FIG. 3, roller 57, acting as a cam follower, rides up cam surface 52 to deflect plunger 54 along the perpendicular axis of push rod 60 in the direction of arrow 63 to the second position as shown. Movement of push rod 60 changes the conduction state of electrical switch 55. Cam surface may preferably be a straight incline or may include a curved profile as long as sufficient incline is present in order to activate electrical switch 55 in a desired manner. When pilot pressure is removed and valve element 27 returns to its deactuated position, an internal spring force of electrical switch 55 restores plunger 54 to its first position and deactivates the sensor signal.

Figure 4:
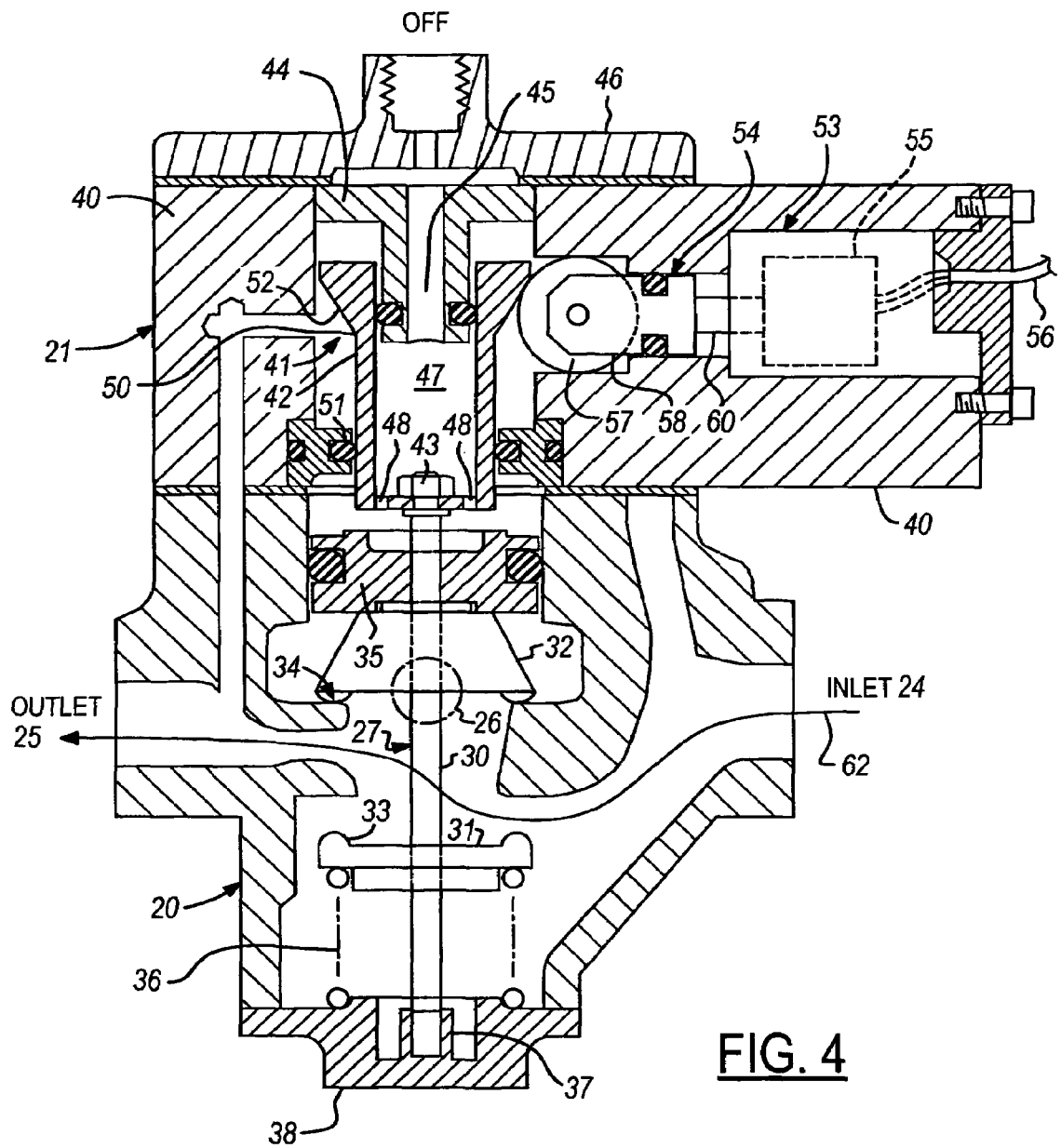
FIG. 4 is a cross-sectional view of a fluid valve of the present invention stuck in an actuated position after pilot pressure has been turned off.

FIG. 4 shows the detection of a failed valve state wherein the fluid valve is stuck in its open condition. Thus, even though pilot pressure has been removed and there is no downward force on piston 35, the restoring force from spring 36 has failed to move valve element 27 back to its deactuated position. Flow path 62 continues to pass fluid through the valve. Since valve element 27 is in its actuated position, plunger 54 remains in its second position so that the switch signal indicates an actuated valve state. The controller can detect this as a failed state by comparing the expected state of the valve with the pilot supply cutoff to the actual state as sensed by the sensing module.

Figure 5:
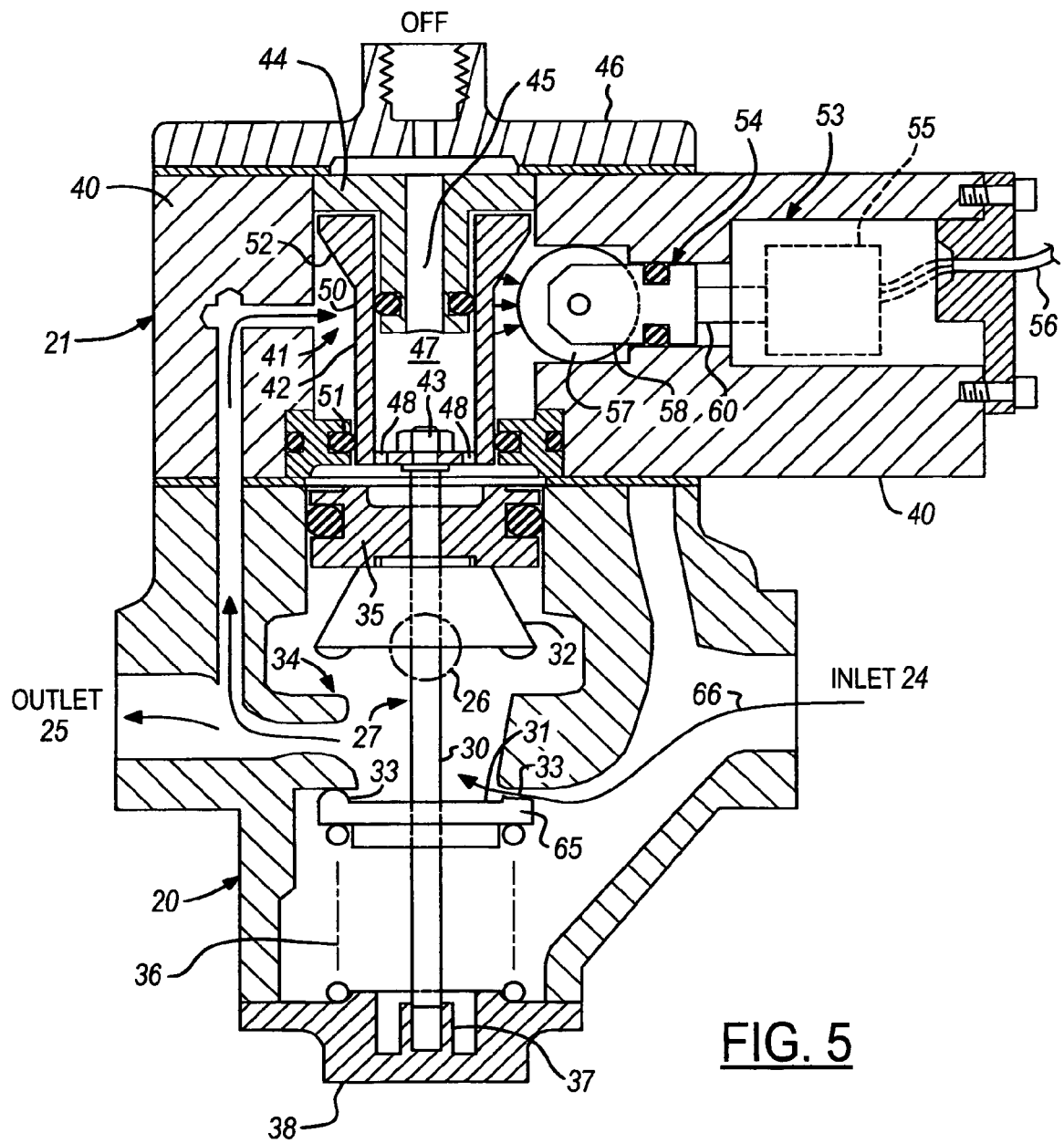
FIG. 5 is a cross-sectional view of a fluid valve of the present invention in a deactuated position with a leaky poppet.

FIG. 5 shows the detection of a leaky valve using the same sensing module. In this failure mode, valve element 27 properly deactuates when pilot pressure is removed. However, a poppet seal 65 has deteriorated so that an opening at valve seat 33 creates an unintended flow path 66 from inlet port 24 to outlet port 25. In a 2-port valve, outlet port 25 becomes quickly pressurized at high pressure. Even in a 3-port valve with exhaust port 26 also coupled to outlet port 25, undesirable pressure levels can be reached at outlet port 25, especially if an outlet muffler or filter (not shown) become backed up. This excess pressure at outlet port 25 is sensed by providing a fluid feedback passage 67 between outlet port 25 and sensing chamber 41. Passage 67 is formed by a passage 68 in valve body 20 and a passage 69 in sensing module body 40. Since chamber 41 is sealed by seals 50 and 51, it becomes pressurized resulting in a force against roller 57 and yoke 58 that works against the internal spring of electrical switch 55. When the fluid pressure in chamber 41 is greater than a predetermined pressure, then plunger 54 moves to its second position to indicate the presence of the pressure. The magnitude of the predetermined pressure is determined by the surface area, the alignment of each portion of the surface area to a line perpendicular to the plunger axis, and the spring force of the electrical switch. When pressure is sufficient to move plunger 54 into its second position, the switch signal indicates that the valve is in an actuated condition even though pilot pressure has turned off. The discrepancy is detected by the controller as a failed valve state.

A decision matrix as implemented by the controller in a preferred embodiment is shown in FIG. 6. When an energizing signal is being provided to a pilot solenoid in order to actuate the fluid valve, there are two possible states of the switch signal. If the switch signal is on (indicating a valve element in the actuated position), then the valve is okay and no failure is detected. If, however, the switch signal is off, then a failure is detected because the valve element is stuck and has failed to actuate properly. When the energizing signal to the pilot solenoid is turned off in order to deactuate the fluid valve, there are again two possible states of the switch signal. If the switch signal is on even though there is no pilot pressure, then a failure is detected. This failure can be caused by either a stuck valve element or a leaky poppet seal, for example. If the switch signal is off, then the valve is okay and no failure is detected.

Figure 7:
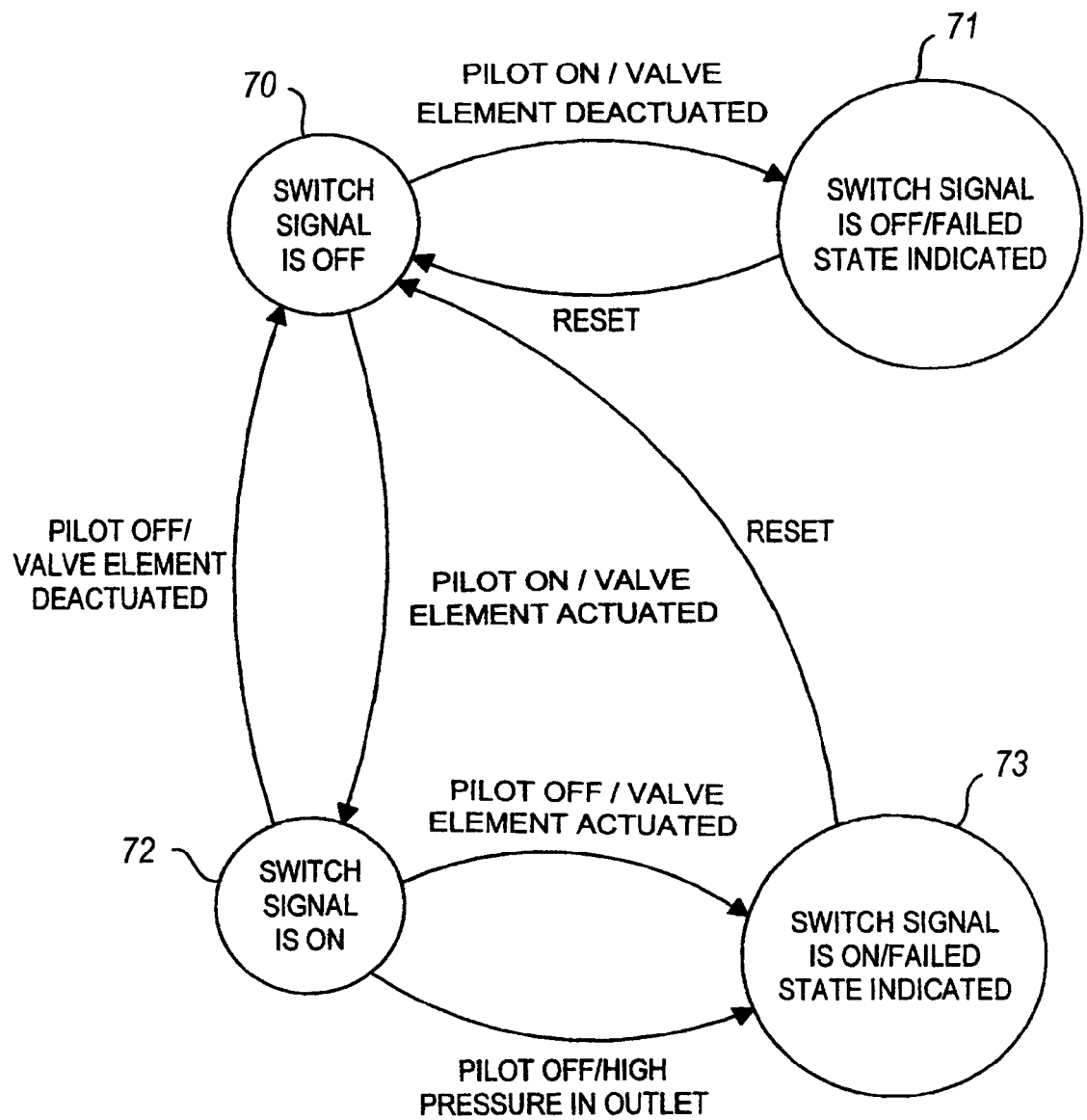
FIG. 7 is a state diagram showing a preferred method of the present invention.

A method of the present invention is further illustrated by the state diagram of FIG. 7. In an initial state 70 the switch signal is off. If the pilot solenoid is turned on but the valve element remains deactuated, then a transition is made to state 71 wherein the switch signal is off and a failed valve state is indicated in any suitable manner by the controller. In response to the indication, the valve system is repaired and the controller is reset in order to return to state 70.

If the pilot solenoid is turned on and the valve element actuated properly, then a transition is made to state 72 wherein the switch signal is turned on, thereby indicating a proper valve actuation. When the pilot solenoid is turned off, and if the valve element properly deactuates, then a return is made to state 70 wherein the switch signal is off.

If the pilot solenoid is turned off while in state 72 but the valve element remains actuated, a transition is made to state 73 wherein the switch signal remains turned on and a failed valve state is indicated. Also, if the pilot solenoid is turned off while in state 72 but high pressure remains at the outlet port for any other reason (such as a leak), a transition is made to state 73. In response to the signal that failed state has been detected, a shutdown of the fluid supply system may be performed automatically. After repairs are made, the controller is reset in order to return to state 70.

What is claimed is:

1. A monitored valve system comprising:
    a valve body including an inlet port, an outlet port, and a valve element having a piston surface at one end thereof for receiving a pilot pressure to move said valve element between a deactuated position and an actuated position, wherein said inlet port and said outlet port are fluidically decoupled when said valve element is in said deactuated position, and wherein said inlet port and said outlet port are fluidically coupled when said valve element is in said actuated position; and
    a sensing module comprising:
        a sensor body having a sensing chamber;
        an extension member fixedly coupled to said valve element, slidable within said sensing chamber along a first axis, and having an inclined cam surface;
        a plunger having a cam follower for engaging said cam surface, wherein said plunger is slidable along a second axis between a first position when said valve element is in said deactuated position and a second position when said valve element is in said actuated position, said plunger being exposed to said sensing chamber; and
        a sensing switch coupled to said plunger for generating a switch signal indicative of said first and second positions;
    wherein said valve body and said sensing body cooperate to form a fluid passage between said outlet port and said sensing chamber, and wherein said plunger moves to said second position when said valve element is in said deactuated position if a fluid pressure greater than a predetermined pressure is present at said outlet port.

2. The monitored valve system of claim 1 wherein said extension member includes a pilot passage for passing pilot pressure through said sensing module to said piston surface.

3. The monitored valve system of claim 2 wherein said extension member comprises a tube member slidable on a boss, and wherein said pilot passage comprises a bore within said boss and an interior space of said tube member.

4. The monitored valve system of claim 3 wherein said tube member is joined at one end to said valve element, and wherein said pilot passage further comprises a plurality of through-holes in said tube member at said one end.

5. The monitored valve system of claim 1 wherein said cam surface is comprised of a ramp.

6. The monitored valve system of claim 5 wherein said cam surface inclines with respect to said first axis.

7. The monitored valve system of claim 1 wherein said cam follower is comprised of a roller.

8. The monitored valve system of claim 1 wherein said second axis is substantially perpendicular to said first axis.

9. The monitored valve system of claim 1 wherein said sensing switch is comprised of an electrical switch.

10. A sensing module for sensing a state of a fluid valve, wherein said fluid valve includes a valve body including an inlet port, an outlet port, and a valve element having a piston surface at one end thereof for receiving a pilot pressure to move said valve element between a deactuated position and an actuated position, wherein said inlet port and said outlet port are fluidically decoupled when said valve element is in said deactuated position, and wherein said inlet port and said outlet port are fluidically coupled when said valve element is in said actuated position, said sensing module comprising:
    a sensor body having a sensing chamber;
    an extension member for fixedly coupling to said valve element, wherein said extension member is slidable within said sensing chamber along a first axis, and wherein said extension member has an inclined cam surface;
    a plunger having a cam follower for engaging said cam surface and slidable along a second axis between a first position corresponding to said valve element being in said deactuated position and a second position corresponding to said valve element being in said actuated position, said plunger being exposed to said sensing chamber; and
    a sensing switch coupled to said plunger for generating a switch signal indicative of said first and second positions;
    wherein said sensing body includes a fluid passage extending from said sensing chamber and for coupling to said outlet port, and wherein said plunger moves to said second position when said valve element is in said deactuated position if a fluid pressure greater than a predetermined pressure is present at said outlet port.

11. The sensing module of claim 10 wherein said extension member includes a pilot passage for passing pilot pressure through said sensing module to said piston surface.

12. The sensing module of claim 11 wherein said extension member comprises a tube member slidable on a boss, and wherein said pilot passage comprises a bore within said boss and an interior space of said tube member.

13. The sensing module of claim 12 wherein said tube member is adapted to be joined at one end to said valve element, and wherein said pilot passage further comprises a plurality of through-holes in said tube member at said one end.

14. The sensing module of claim 10 wherein said cam surface is comprised of a ramp.

15. The sensing module of claim 14 wherein said cam surface inclines with respect to said first axis.

16. The sensing module of claim 10 wherein said cam follower is comprised of a roller.

17. The sensing module of claim 10 wherein said second axis is substantially perpendicular to said first axis.

18. The sensing module of claim 10 wherein said sensing switch is comprised of an electrical switch.

19. A method for sensing a state of a fluid valve wherein said fluid valve includes a valve body including an inlet port, an outlet port, and a valve element having a piston surface at one end thereof for receiving a pilot pressure to move said valve element between a deactuated position and an actuated position, wherein said inlet port and said outlet port are fluidically decoupled when said valve element is in said deactuated position, and wherein said inlet port and said outlet port are fluidically coupled when said valve element is in said actuated position, said method comprising the steps of:

sensing longitudinal movement of said valve element via a cam-actuated plunger moving between a first position corresponding to said valve element being in said deactuated position and a second position corresponding to said valve element being in said actuated position, said plunger being coupled to a switch for generating a switch signal indicative of said first and second positions;

sensing the presence of a fluid pressure at said outlet port greater than a predetermined pressure when said valve element is in said deactuated position by applying said fluid pressure at said outlet port against said cam-actuated plunger in a manner adapted to move said cam-actuated plunger to said second position.

20. The method of claim 19 further comprising the steps of:

applying said pilot pressure to said piston surface; and detecting said fluid valve to be in a faulted state if said switch signal indicates that said plunger is in said first position.

21. The method of claim 19 further comprising the steps of:

decoupling said pilot pressure from said piston surface; and detecting said fluid valve to be in a faulted state if said switch signal indicates that said plunger is in said second position.

* * * * *